Feb. 21, 1933.  A. R. WEIS  1,898,278
SEALING DEVICE
Filed April 14, 1930  2 Sheets-Sheet 1
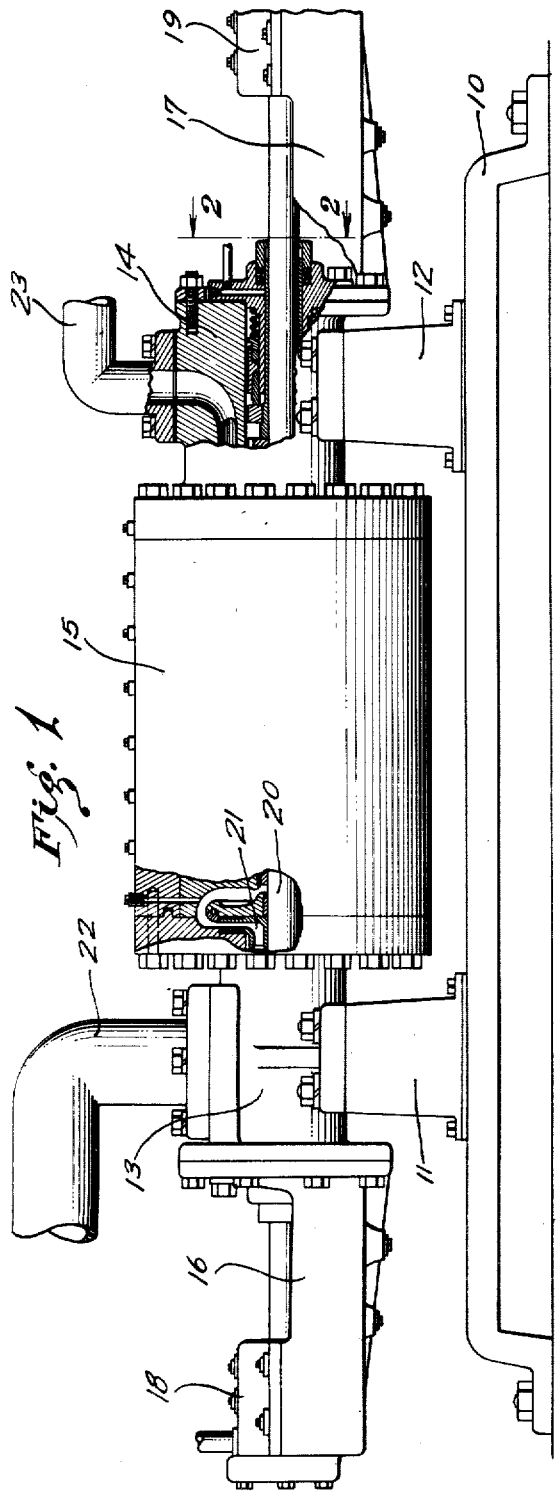
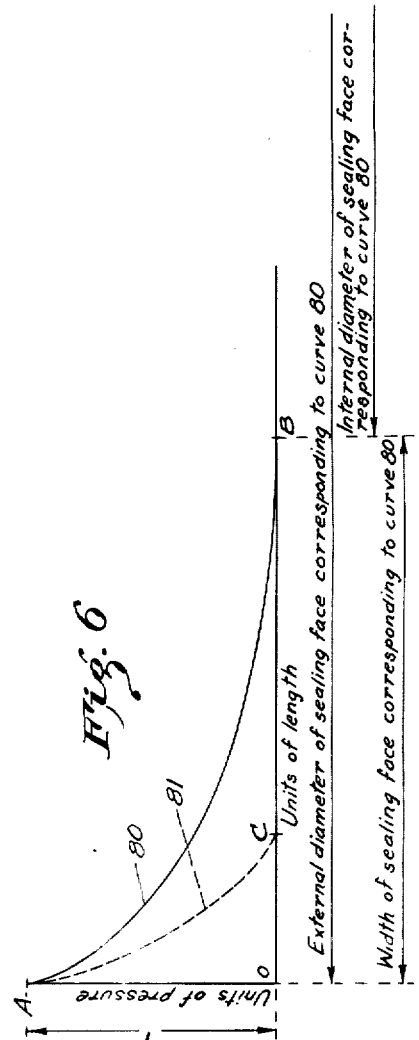
INVENTOR
Arthur R. Weis.
By
ATTORNEY.

Feb. 21, 1933.   A. R. WEIS   1,898,278
SEALING DEVICE
Filed April 14, 1930   2 Sheets-Sheet 2
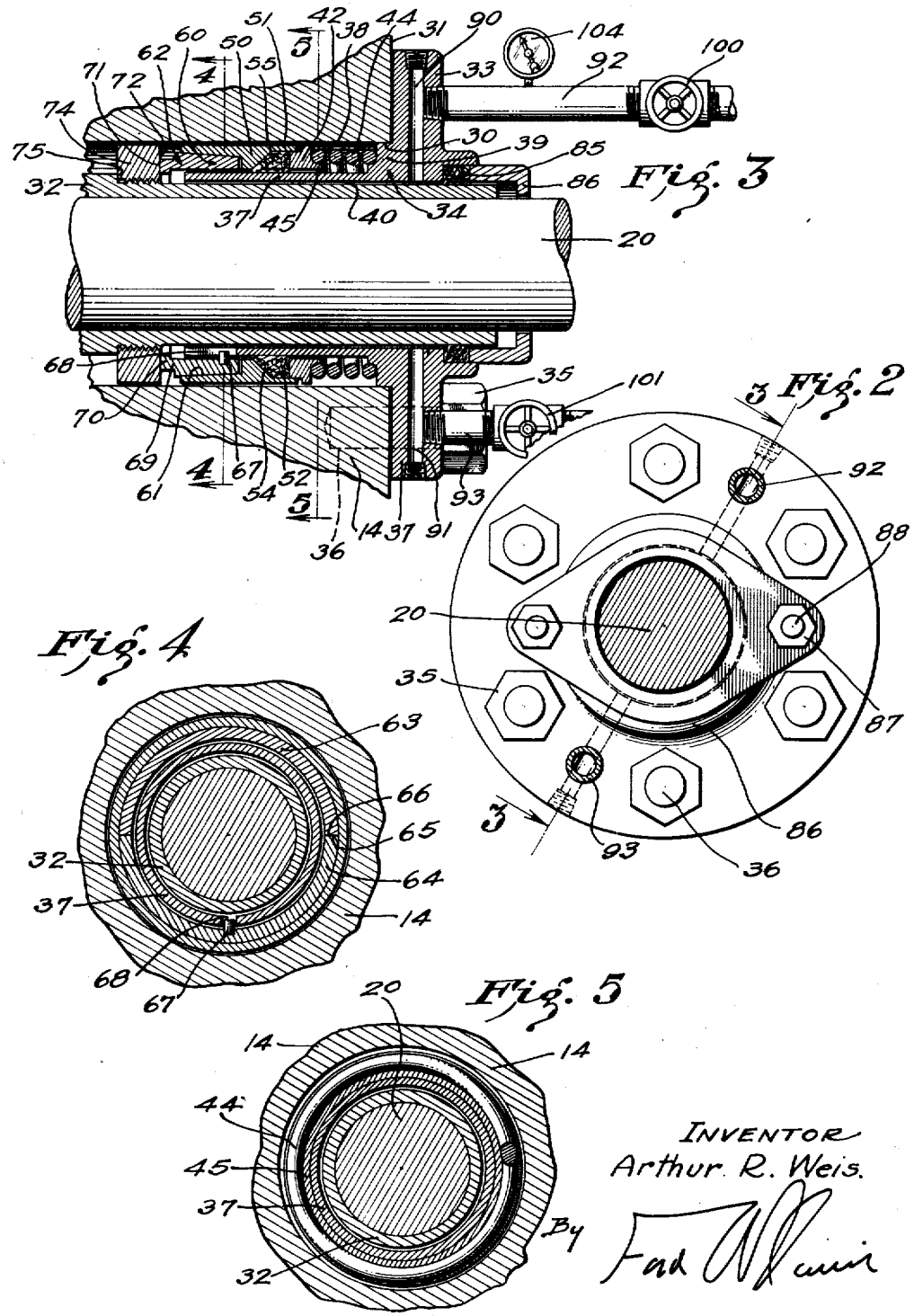
INVENTOR
Arthur R. Weis.
ATTORNEY.

Patented Feb. 21, 1933

1,898,278

UNITED STATES PATENT OFFICE

ARTHUR R. WEIS, OF HUNTINGTON PARK, CALIFORNIA, ASSIGNOR OF ONE-HALF TO PACIFIC PUMP WORKS, OF LOS ANGELES, CALIFORNIA, A CORPORATION OF CALIFORNIA, AND ONE-HALF TO GEORGE E. BIGELOW, OF HUNTINGTON PARK, CALIFORNIA

SEALING DEVICE

Application filed April 14, 1930. Serial No. 444,046.

My invention relates to sealing devices, and more particularly to a novel form of sealing device finding particular utility in high-pressure hot-oil pumps.

Various methods of sealing rotating and stationary elements together have been used. Among these is the conventional stuffing box with a compressible packing therein which surrounds and engages the shaft. Such a device is entirely unsuited for use with a hot-oil turbine-pump where temperatures of 550° F. are frequent and heads as high as 2,000 pounds per square inch are not at all uncommon.

It is an object of the present invention to provide a novel sealing structure in which the sealing means does not necessarily work against a pressure equal to the difference in pressure between the fluid inside of the pump and the fluid outside thereof.

A further object of the invention is to provide a novel method for preventing vapors from escaping into the surrounding atmosphere.

Still a further object of the invention is to provide a novel sealing construction wherein a liquid is in communication with the sealing surfaces, this liquid serving to condense any vapors which escape when the seal is used on a hot-oil turbine-pump.

Various experiments have been conducted with more or less success using an annular sealing member around the shaft and resiliently engaging a portion thereof, the engaging surfaces being formed of metal. By maintaining a very thin film of liquid between these surfaces, it is possible to secure a very satisfactory seal. I have found, however, that it is preferable to limit the width of the sealing member to a value less than that at present used so as to insure the maintenance of the film between the metallic surfaces.

It is an object of this invention to provide an annular sealing member engaging a surface of a rotatable member in sealing relationship to define a sealing zone, the distance across the sealing zone being three-sixteenths of an inch or less.

When utilizing such a seal, it is customary to compress a packing against the rear of the sealing member and exert a resilient force thereon so that this member is moved into resilient engagement with the rotating element. This force exerted on the packing is usually obtained by the use of a spring surrounding the shaft, there being a washer positioned between the spring and the packing. The force on the packing tends not only to move the sealing member into engagement with the rotating element, but also expands the packing in its cavity, thereby forming an effective seal. In some instances one wall of this cavity is rotating relative to the other, and in other instances these walls are stationary relative to each other.

It is an object of the present invention to provide a sealing device of this class wherein the packing member engages but a single surface along which it must slide under the action of a spring.

Another object of the invention is to provide an individual retaining member positioned adjacent the packing and adjacent the sealing member.

One of the primary objections to the use of this type of seal lies, however, in the fact that the members are difficult to replace or inspect. For instance, the removal of such a seal on a hot-oil turbine-pump often requires a shut down of several hours.

It is an important object of the present invention to provide a sealing assembly which is easily and quickly removable for inspection or repair.

This I accomplish by the use of a removable sleeve structure which carries the sealing member as a unit, this sealing member being easily removable when the sleeve structure is withdrawn from the pump.

It is an object of this invention to provide an individual sleeve structure which may be easily removed from the apparatus and which carries an annular sealing member which may be removed transversely relative to the shaft once the sleeve structure is withdrawn.

A further object of the invention is to provide a sealing structure of this type which is formed in sections so as to be easily removable and replaceable.

The usual type of follower which is positioned between the spring and the packing is in the form of a washer. I have found this to be undesirable, and it is an object of the present invention to provide a follower which is relatively long and which slides along the shaft without danger of its tipping due to the spring pressure thereon.

A further object of the invention is to provide a follower which centralizes the spring.

A further object of the invention is to provide a novel hot-oil pump so designed that the packing means utilized thereon is easily removable in a fraction of the time previously required for this operation and without the necessity of disturbing the bearings thereon.

Still further objects of the invention will be apparent to those skilled in the art from the following description:—

Referring to the drawings,—

Fig. 1 is a side view, partially in section, of a hot-oil pump of novel construction which incorporates the seal of my invention.

Fig. 2 is a sectional view taken on the line 2—2 of Fig. 1.

Fig. 3 is a sectional view taken on the line 3—3 of Fig. 2, and illustrates the details of the seal of my invention.

Figs. 4 and 5 are sectional views taken on the corresponding lines of Fig. 3.

Fig. 6 is a graphical representation of the pressure gradient existing between the sealing surfaces of such a seal.

Referring particularly to Fig. 1, I have illustrated a hot-oil pump of the centrifugal type which is capable of pumping oil at temperatures up to 650° F. against a head of 2,000 pounds per square inch or more. This pump includes a base 10 on which pedestals 11 and 12 are secured. Supported on these pedestals are heads 13 and 14 between which is secured the operating mechanism of the pump designated by the numeral 15. The construction of this operating mechanism is not a part of the present invention, but is claimed in certain co-pending applications. Suffice it to say here that the heads 13 and 14 respectively mount bearing supports 16 and 17 which carry bearings 18 and 19 spaced a distance from these heads, these bearings journalling a pump shaft 20 driven from a suitable source, not shown. Secured to this shaft are impellers 21 rotating in impeller chambers of the pump structure 15, these impellers drawing a fluid to be pumped through an intake pipe 22 and discharging it through a discharge pipe 23.

It is necessary to suitably seal the shaft relative to the stationary walls of the pump, and the greatest difficulty is usually experienced at the exhaust end of the pump. It is here that my invention finds particular utility although a similar seal may be utilized to good advantage in the intake head 13.

Referring particularly to Figs. 1 and 3, the exhaust head 14 provides a bore 30 extending inwardly concentric with the shaft 20, the axis thereof being substantially perpendicular to an end-face 31 of the head 14. At that section of the shaft which extends through this head, I prefer to provide a shaft sleeve 32, but it should be understood that this construction is not necessary to the utility of my invention. For this reason I have termed the shaft sleeve 32 and the shaft 20 a rotatable element without limiting myself to the utilization of two members in forming this element.

Clamped against the end face 31 of the head 14 is a flange or end wall 33 of a sleeve structure 34, it being usually desirable to position a gasket therebetween so that by tightening nuts 35 threaded to studs 36, it is possible to clamp the flange 33 in fluid-tight relationship with the head 14.

As best shown in Fig. 3, the sleeve structure 34 includes a sleeve 37 which extends a material distance into the bore 30, this sleeve cooperating with the walls of the bore in defining an annular chamber 38. The sleeve 37 is joined to the flange 33 by a hub 39, the outer diameter of which is only slightly less than the diameter of the bore 30 so that the sleeve structure is centralized thereby. It will be apparent from Fig. 3 that the inner diameter of the sleeve 37 is greater than the external diameter of the shaft sleeve 32 so as to provide an annular space 40 therebetween.

Adapted to slide relative to the sleeve 37 and positioned in the annular chamber 38 is a follower member 42 which is annular in shape, the internal diameter being only slightly larger than the external diameter of the sleeve 37 so as to be guided thereby. Compressed between this follower and the hub 39 is a compression spring 44. As best shown in Fig. 3, this spring is of such a diameter as to be spaced from the walls of the bore 30 and the outer surface of the sleeve 37, this being accomplished by forming an arcuate lip 45 on the follower member 42 which corresponds in curvature to the inner or left end of the spring 44, thereby centralizing this spring in the annular chamber 38. A similar arcuate surface is formed on the hub 39 and cooperates with the lip 45 in supporting the spring 44.

Also slidable in the annular chamber 38 along the sleeve 37 is a retaining member 50, one end of which provides a hood 51 forming a packing chamber 52 around the sleeve structure 34, the inner end of this packing chamber being formed by a conical wall 54. A soft packing 55 is positioned in this packing chamber and is adapted to be compressed therein by the follower member 42, the forward end of which extends into the packing chamber inside the hood 51. This not only causes an expansion of the packing 55 against the walls of the packing chamber and against the outer surface of the sleeve 37, but also exerts a resilient inward or leftward force on the retaining member 50.

Formed in the inner end of the retaining member 50 is a cavity 60 having walls 61 which diverge in a direction toward the interior of the pump, the inner wall of this cavity being defined by the sleeve 37. Adapted to be positioned in this cavity is a sealing structure 62 which is preferably formed of a pair of annular sealing members 63 and 64 which are complementary to each other and which provide end faces 65 and 66 which come into engagement with each other when these members are forced sufficiently far into the cavity 60 to engage the tapered walls 61 thereof. It is also possible to so design the sealing members that the end faces 65 and 66 are slightly separated when these members come into engagement with the tapered walls 61. To insure rigidity of the sealing structure 62, I prefer to taper the outer walls of the sealing members to correspond to the taper of the walls 61 of the cavity 60, so that a surface engagement between the sealing structure and the retaining member 50 is obtained.

It is possible to use the clamping action which takes place between the sealing structure and the walls 61 for the purpose of preventing any rotation of the sealing structure in the cavity 60. However, I prefer to utilize a pin 67 retained in one of the sealing members for this purpose, this pin extending into a longitudinal slot 68 formed in the inner end of the sleeve 37.

Each of the sealing members 63 and 64 provides a neck 69, to the end of which is integrally formed a head 70, the forward faces of the heads 70 lying in a single plane and cooperating in defining a sealing face 71 which is annular in shape and all points of which lie in a single plane which is preferably perpendicular to the axis of the shaft 20. The spring 44 acts as a resilient means and forces this sealing face 71 into engagement with a sealing face defined by a shoulder 72 formed on the rotatable element, this shoulder being parallel to the sealing face 71. The sealing face of the sealing structure 62 and the sealing face of the shoulder 72 thus cooperate in defining a sealing zone which, in the preferred embodiment of the invention extends radially outward. In Fig. 3 I have shown this shoulder as being formed on a collar 74 which is threaded onto the sleeve 32 and into engagement with a shoulder 75 thereof. It should be understood, however, that I am not limited to this construction.

When the seal is in operation, the high pressure within the pump is transmitted to the bore 30 around the collar 74 and acts upon the outer exposed surface of the sealing structure 62. The pressure built up in such a high pressure region is due to the oil vapor, although in exceptional instances it may be due to the oil itself. In either event there is formed in the sealing zone between the sealing face 71 and the shoulder 72 an extremely thin film of oil which retains these sealing surfaces in slightly spaced relationship and prevents excessive wear therebetween. The thickness of this oil film is dependent upon the pressure of the spring 44 and the retarding action of the packing 55, the latter being small due to the fact that the only surface along which this packing slides is the surface of the sleeve 37. I have found, however, by extensive experiments that it is very desirable to make distance across the sealing zone much smaller than has heretofore been considered advisable. This I accomplish in the preferred embodiment of the invention by making the width of the sealing face approximately one-half the width of the face at present used in devices of this character. I prefer to make this width approximately one-eighth of an inch, and in no instance should this be greater than three-sixteenths of an inch if the best sealing action is to be obtained. The reason for this narrow sealing face is so that a sufficiently high-pressure gradient will be built up thereacross to maintain the film at all sections of the sealing zone. If this gradient becomes too small at any particular section, the pressure of the spring 44 tends to break the film at this section, thus putting the entire pressure of this spring on only that portion of the sealing face having a gradient high enough to maintain the film.

This action can best be understood by a reference to Fig. 6 in which I have graphically represented the gradient relationships which exist across such a sealing face. In this figure I have plotted units of length as abscissa and units of pressure as ordinates, the point A representing the pressure on the exterior of the sealing structure and the point O representing the pressure on the interior of this sealing structure, the difference between these two pressures being the pressure against which the seal is effective. The point O also represents the outermost portion of the sealing face, while the point B represents the innermost portion of the sealing face so that the distance O—B represents the width of the sealing face. The pressure effective in maintaining the film at any section of the sealing face is represented by a curve 80 which drops off steeply from the point A, thus indicating that the gradient at the outer portion of the sealing face is very high, and that the gradient adjacent the inner portion of the sealing face is substantially lower, it being understood that the slope of the curve 80 represents the gradient at any section represented on the scale of abscissa. It will thus be seen that there may be sufficient gradient at the outer portion of the sealing face to effectively maintain the fluid film, while at the same time the pressure gradient at the inner portion of this sealing face is insufficient to maintain a film. This means that not only does the outer portion of the sealing face take substantially all of the pressure of the spring 44 due to the film maintained at this outer portion, but it also means that the film adjacent the inner portion of the sealing face is not maintained and this space tends to act as a capillary space to draw the film away from the outer portion of the sealing face. This not only increases the pressure which is to be sealed against, but tends to increase the leakage through the seal.

I have found by making the sealing face substantially narrower in width than has heretofore been the practice that a much better sealing action is obtained. Represented graphically, the gradient adjacent the sealing face thus formed is represented in Fig. 6 by a dotted curve 81, the point C representing the point on the innermost portion of the sealing face so that the distance O—C represents the width of the sealing face. In this instance, the curve 81 drops off even more steeply from the point A, but the important feature is that the gradient is maintained sufficiently high at all points across the sealing face so that a film is maintained completely across this face.

In the seal of my invention any leakage of oil vapor which takes place between the sealing face 71 and the shoulder 72 is discharged into a low pressure region and thence into the annular space 40 inside of the sleeve 37. The outer end of this annular space is sealed by a packing 85 compressed in a cavity of the flange 33 by a gland 86, best shown in Figs. 2 and 3, adjustment of this gland being made possible by nuts 87 threaded to studs 88 secured in the flange 33. I prefer to maintain a body of liquid in the space 40 which will condense any oil vapors passing the sealing structure 62. I have furthermore found it preferable to continuously circulate a liquid through this chamber instead of retaining a stagnant body of liquid therein. By continuously renewing this liquid, the oil vapors are not only condensed, but the oil is withdrawn from the annular space 40.

The circulation system is best shown in Fig. 3 and comprises diagonally opposite passages 90 and 91 formed in the flange 33 and communicating respectively with intake and discharge pipes 92 and 93. This liquid may be in the nature of water, or may be a liquid which will dissolve the oil being pumped by the pump. It is furthermore desirable that this liquid be cool so as to maintain the packing 55 and the sealing structure 62 as cool as possible, thus increasing the life of these members. In any event, however, the liquid entering the pipe 92 passes downward through the passage 90 and into the annular space 40, this liquid usually substantially filling this space and being subsequently removed therefrom through the passage 91 and the pipe 93.

Not only does this circulation system prevent any escape of oil vapors into the surrounding atmosphere, a defect which has heretofore prevented the use of such turbines in confined rooms where the presence of manual help is necessary, but in addition, this circulation system provides a means for decreasing the pressure against which the sealing structure 62 must seal. Thus, if the pressure inside of the pump is 2,000 pounds per square inch and the pressure of the liquid in the annular space 40 is maintained at a value of 1,000 pounds per square inch, the sealing structure 62 is required only to seal against a pressure of one thousand pounds per square inch, the packing 85 sealing off the remaining thousand pounds per square inch.

Inasmuch as the packing 85 is relatively cool, this packing may be of the conventional type and can be effectively maintained due to the cooling action of the circulating liquid. Furthermore, this packing is readily accessible and it is a simple matter to adjust the gland 86 from time to time to compensate for any wear on the packing 85. The desirable pressure in the annular space 40 is maintained by valves 100 and 101 placed respectively in the pipes 92 and 93, and this pressure is registered on the gage 104. If desired any automatic means for maintaining this pressure may be utilized without departing from the spirit of this invention.

It is desirable, however, that the differential pressure between the inner and outer portions of the sealing zone be maintained sufficiently high to supply the necessary gradient for maintaining a film of oil completely across this sealing face. It is thus not usually practical to increase the pressure in the annular space 40 beyond a certain point, though it is desirable to maintain a certain amount of pressure in this space.

When the seal is to be removed for inspection, the operator removes the nuts 35 from the studs 36 and loosens the gland 86 whereupon the sleeve structure 34 may move along the shaft 20, the retaining member 50 and the sealing structure 62 being withdrawn therewith as a unit. It is an important feature of this invention to position the bearing 19 sufficiently far from the head 14 so that the sleeve structure 34 may be moved out of the bore 30 a sufficient distance to permit the sealing members 63 and 64 to be withdrawn from the cavity 60. Once these sealing members are removed from the cavity they may be removed from around the shaft by withdrawing them transversely. If necessary these members are replaced, and the sleeve structure 34 is again slid into the bore 30 and clamped in place by the bolts 35. The simplicity of this arrangement is very important, as will be apparent when it is considered that the old type of sealing structure which included a single ring as a sealing member required the removal of the bearing 19 to permit replacement.

I claim as my invention:

1. In combination in a sealing device for a rotatable element: a sleeve member around said rotatable element; a retaining member movable relative to said sleeve member and providing a cavity having tapering walls; and a plurality of sealing members each providing tapering surfaces corresponding in taper to the taper of the walls of said cavity and fitting therein, said sealing members engaging a portion of said rotatable element in sealing relationship.

2. In combination in a sealing device for a rotatable element: a sleeve structure surrounding said rotatable element but spaced a distance therefrom in a manner to provide an annular space therebetween; sealing means carried by said sleeve structure and engaging a portion of said rotatable element in sealing relationship, said sealing means forming a wall of said annular space whereby any leakage between said sealing means and that portion of said rotatable element with which it engages is discharged into said annular space; auxiliary sealing means for sealing the liquid in said annular space; means for circulating a body of liquid in said annular space; and means for controlling the pressure of said liquid in said annular space to control the pressure sealed off by said sealing means.

3. In combination: a body providing a bore; a rotatable element extending through said bore; a sleeve structure around said rotatable element and removable from said bore as a unit, said sleeve structure providing a sleeve extending into said bore around said rotatable element and providing an end wall closing the outer end of said bore whereby said sleeve and said end wall cooperate in defining an annular chamber in said bore around said sleeve, said end wall including a hub of a diameter only slightly less than said bore and slidable therein when said sleeve structure is inserted to centralize said sleeve with respect to said rotatable element; an annular sealing structure movable in said annular chamber and removable with said sleeve structure; walls defining a shoulder on said rotatable element; and spring means in said annular chamber for forcing said annular sealing structure into resilient engagement with said shoulder.

4. In combination: a bore; a rotatable element extending through said bore but being of smaller diameter than the walls of said bore, said rotatable element providing a shoulder defining a sealing face; a sealing unit of annular shape and insertable into the annular space between said rotatable element and the walls of said bore and being of smaller diameter than said walls to move easily thereinto, said sealing unit including a sleeve member of larger diameter than said rotatable element to provide an auxiliary space therebetween, said sealing unit also including a sealing means carried by said sleeve member and cooperating with said sealing face to form a sealing zone communicating with said auxiliary space between said rotatable element and said sleeve member; and sealing means around said rotatable element for sealing said auxiliary space.

5. In combination: a bore; a rotatable element extending through said bore but being of smaller diameter than the walls of said bore, said rotatable element providing a shoulder defining a sealing face; a sealing unit of annular shape and insertable into the annular space between said rotatable element and the walls of said bore and being of smaller diameter than said walls to move easily thereinto, said sealing unit including a sleeve member of larger diameter than said rotatable element to provide an auxiliary space therebetween, said sealing unit also including a sealing means carried by said sleeve member and cooperating with said sealing face to form a sealing zone communicating with said auxiliary space between said rotatable element and said sleeve member; sealing means around said rotatable element for sealing said auxiliary space; and means for controlling the pressure in said auxiliary space to control the pressure differential across said sealing zone.

6. In combination in a sealing device for a rotatable element: a sleeve member around said rotatable element; a retaining member slidable along said sleeve member, said retaining member providing an annular cavity in the forward end thereof and an annular packing chamber at the rear end thereof; walls defining a shoulder on said rotatable element and spaced from the forward end of said annular cavity; a sealing structure removably retained in said annular cavity and extending forwardly therefrom to engage said shoulder in sealing relationship; a packing in said annular packing chamber and engaging said sleeve member; a follower member engaging said packing to compress same against said sleeve; and a spring engaging said follower member to compress said packing and resiliently move said retaining member forward to maintain said sealing structure in resilient engagement with said shoulder.

In testimony whereof, I have hereunto set my hand at Los Angeles, California, this 9th day of April 1930.

ARTHUR R. WEIS.

CERTIFICATE OF CORRECTION.

Patent No. 1,898,278.  February 21, 1933.

ARTHUR R. WEIS.

It is hereby certified that the above numbered patent was erroneously issued to Pacific Pump Works, of Los Angeles, California, a corporation of California, and George E. Bigelow, of Huntington Park, California, as assignees of one-half, each, of said invention, whereas said Letters Patent should have been issued to the inventor, said Weis, and one-half to Pacific Pump Works, of Los Angeles, California, a corporation of California, and one-fourth to George E. Bigelow, of Huntington Park, California, as assignees, as shown by the records of assignments in this office; and that the said Letters Patent should be read with this correction therein that the same may conform to the record of the case in the Patent Office.

Signed and sealed this 16th day of May, A. D. 1933.

M. J. Moore.

(Seal)  Acting Commissioner of Patents.

and engaging said sleeve member; a follower member engaging said packing to compress same against said sleeve; and a spring engaging said follower member to compress said packing and resiliently move said retaining member forward to maintain said sealing structure in resilient engagement with said shoulder.

In testimony whereof, I have hereunto set my hand at Los Angeles, California, this 9th day of April 1930.

ARTHUR R. WEIS.

CERTIFICATE OF CORRECTION.

Patent No. 1,898,278.                February 21, 1933.

ARTHUR R. WEIS.

It is hereby certified that the above numbered patent was erroneously issued to Pacific Pump Works, of Los Angeles, California, a corporation of California, and George E. Bigelow, of Huntington Park, California, as assignees of one-half, each, of said invention, whereas said Letters Patent should have been issued to the inventor, said Weis, and one-half to Pacific Pump Works, of Los Angeles, California, a corporation of California, and one-fourth to George E. Bigelow, of Huntington Park, California, as assignees, as shown by the records of assignments in this office; and that the said Letters Patent should be read with this correction therein that the same may conform to the record of the case in the Patent Office.

Signed and sealed this 16th day of May, A. D. 1933.

M. J. Moore.

(Seal)                Acting Commissioner of Patents.

CERTIFICATE OF CORRECTION.

Patent No. 1,898,278.  February 21, 1933.

ARTHUR R. WEIS.

It is hereby certified that the above numbered patent was erroneously issued to Pacific Pump Works, of Los Angeles, California, a corporation of California, and George E. Bigelow, of Huntington Park, California, as assignees of one-half, each, of said invention, whereas said Letters Patent should have been issued to the inventor, said Weis, and one-half to Pacific Pump Works, of Los Angeles, California, a corporation of California, and one-fourth to George E. Bigelow, of Huntington Park, California, as assignees, as shown by the records of assignments in this office; and that the said Letters Patent should be read with this correction therein that the same may conform to the record of the case in the Patent Office.

Signed and sealed this 16th day of May, A. D. 1933.

M. J. Moore.

(Seal)  Acting Commissioner of Patents.